No. 655,245. Patented Aug. 7, 1900.
D. D. KIMBERLIN.
MILK AERATOR.
(Application filed Nov. 18, 1899.)
(No Model.)
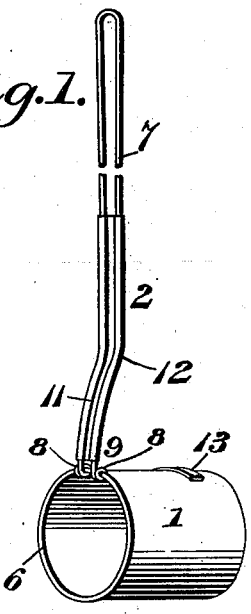
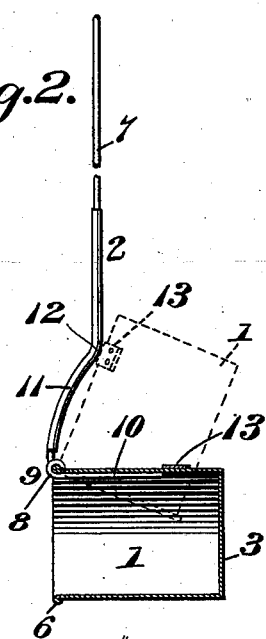
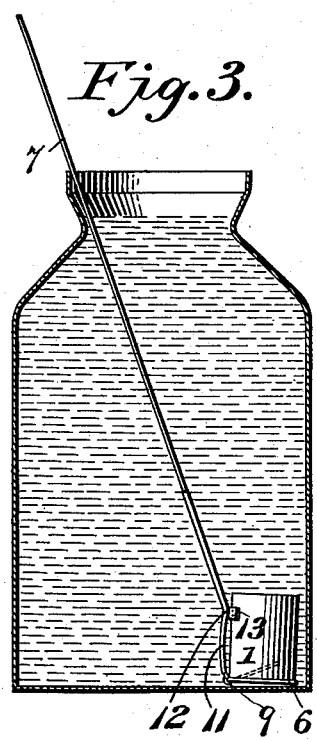
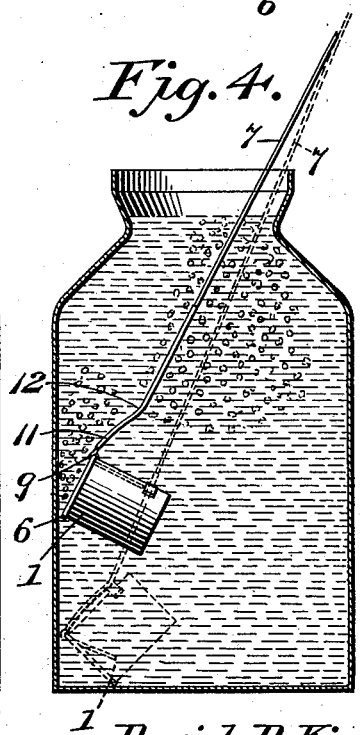
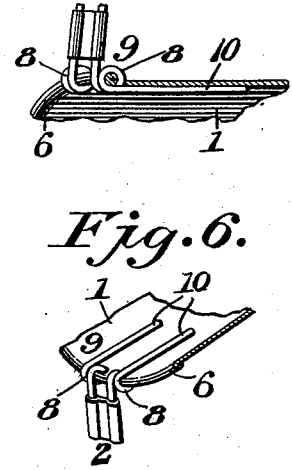
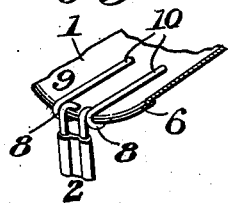
David D. Kimberlin, Inventor
Witnesses
Edwin H. McKee
B. G. Foster
By
Attorney
THE NORRIS PETERS CO., PHOTO-LITHO., WASHINGTON, D. C.

UNITED STATES PATENT OFFICE.

DAVID D. KIMBERLIN, OF HUDSON, OHIO.

MILK-AERATOR.

SPECIFICATION forming part of Letters Patent No. 655,245, dated August 7, 1900.

Application filed November 18, 1899. Serial No. 737,520. (No model.)

*To all whom it may concern:*

Be it known that I, DAVID D. KIMBERLIN, a citizen of the United States, residing at Hudson, in the county of Summit and State of Ohio, have invented a new and useful Milk-Aerator, of which the following is a specification.

This invention relates to milk-aerators; and one object is to provide a simple, cheap, and efficient device by which milk may be quickly and thoroughly aerated without removing it from the can or receptacle.

A further object of the invention is to provide a device for aerating milk that is constructed in the form of a dipper, so that it may be used as such.

These objects are obtained by the construction shown in the drawings which accompany and form a part of this specification, and in which—

Figure 1 is a perspective view of an aerator constructed in accordance with this invention. Fig. 2 is a sectional view of the same. Fig. 3 is a view showing the first position of the cup when plunged to the bottom of a can of milk. Fig. 4 is a view showing the cup tilted to allow the escape of the air. Fig. 5 is a detail view more clearly showing the manner of hinging the cup to the handle. Fig. 6 is a detail view showing the stops on the inside of the cup.

In the drawings, 1 designates a cup or receptacle, and 2 a handle to which the cup is hinged. The cup 1 is cylindrical in form, open at the top, and having a flat bottom 3. Around the open end of the cup 1 is an annular rim 6, which strengthens the cup and forms the bearing for the hinged handle 2. The cup is hinged to the handle 2 at the top, and said handle 2 is preferably made of a single wire 7 bent double, forming two parallel side members which are coiled, as at 8, around the rim 6 to form the hinge 9. The ends 10 of the wire side members are bent at right angles to the main handle portion and project inside the cup, forming a stop to limit the downward-swinging movement of the same. The lower portions of the handle members are connected by a strip of sheet metal which is preferably secured thereto by being bent around the same. The lower portion of the handle is also provided with the offset bend 11, which forms a stop or abutment 12, against which the cup rests when it is in the position shown in Fig. 3 or in dotted lines in Fig. 2, and thereby holds the cup at an angle to the handle, the lower or open end of the cup and the main portion of the handle forming an obtuse angle. It will thus be seen that the cup has a swinging movement between the stops 10 and 12. To prevent the abutment 12 wearing the wall of the cup, I reinforce the wall at its point of contact with the abutment 12 by a small plate 13, suitably secured to the external wall of the cup. This plate receives the wear of the abutment, and when worn out may be replaced, thus preserving the wall of the cup.

The preferable manner of operating the device in an ordinary milk-can is as follows: The cup is held in a vertical inverted position, resting against the abutment 12, as shown in dotted lines in Fig. 2, the opposite side resting against the inner wall of the can-mouth. It is then plunged to the bottom of the can and near one side, the upper end of the handle being held at the opposite side of the can-mouth, as shown in Fig. 3. In this position the cup, being held at an angle to the handle, will still be in a substantially-vertical position and the edge of the open end will be in a substantially-horizontal plane. The handle is then moved directly across to the opposite side of the can, thus tilting the cup and allowing a portion of the confined air to escape. From this position the cup is moved directly across the bottom of the can, thus tilting it to a greater degree and allowing more air to escape. After reaching this position the handle is given a quick upward jerk, and the pressure of the milk upon the bottom will force the cup away from the handle and into the position shown in Fig. 4, allowing the remaining air to escape. The stops 10 limit the downward-swinging movement of the cup, so that it will empty itself when it is withdrawn from the milk, with the handle in a perpendicular position. This operation is repeated until the milk is properly aerated.

In case the milk should be in a can the mouth of which is too small to permit the withdrawal of the cup when in the position shown in Fig. 4 the cup may be temporarily fastened to the handle in the position shown in Fig. 3—for instance, by a rubber band or equivalent fastening. In this case I carry the operation, as before explained, as far as shown in dotted lines in Fig. 4 and then raise the cup from the bottom, keeping it close to the wall, thus tilting it more and more as it is drawn toward the top.

It will also be noted that the construction of the device admits of its being used as a dipper when so desired.

It will thus be seen that I have constructed a very simple, efficient, and inexpensive device that is easy to manipulate and by means of which the milk can be quickly and thoroughly aerated without removing it from the can or receptacle in which it has been placed. Furthermore, by reason of its few and simple parts it is very easily cleansed.

I do not wish to be limited to the exact construction shown, as changes in the form, proportion, size, and minor details of construction within the scope of the appended claims may be resorted to without departing from the principle or sacrificing any of the advantages of this invention.

Having thus described the invention, what I claim as new, and desire to secure by Letters Patent, is—

1. In a device of the class described, a handle, an air-cup pivoted to the handle, said air-cup being so arranged with relation to the handle that it can swing into an inverted position when thrust downwardly into a liquid and thereby carry air into the same, and tilt to another position upon an upward movement, and means for limiting said tilting movement, substantially as described.

2. In a device of the class described, a handle having an abutment, and a cup hinged to the handle and adapted to rest against the abutment, substantially as described.

3. In a device of the class described, a handle, a cup hinged to the handle, and a stop arranged to limit the movement of the cup, substantially as described.

4. In a device of the class described, the combination with a cup, of a handle formed by a single piece of wire, the ends of which are coiled around the rim of the cup, whereby the cup and handle are hinged together, substantially as described.

5. In a device of the class described, the combination with a cup, of a handle formed of a single piece of wire or similar material bent upon itself, the ends of said wire being coiled around the rim of the cup forming a hinge and extending into the cup, whereby a stop is formed to limit the movement of the cup, substantially as described.

6. In a device of the class described, the combination with a handle, of a cup hinged to the handle, said handle having an offset bend forming an abutment or stop to hold the cup at an angle to the handle, substantially as described.

7. In a device of the class described, the combination with a handle, of a cup hinged to the handle, and a stop carried by the handle and projecting into the cup, whereby said cup is limited in its swinging movement, substantially as described.

8. In a device of the class described, a handle having an offset bend forming an abutment, a cup hinged to the handle, and a stop carried by the handle and projecting into the cup, whereby the cup is limited in its swinging movement by the abutment of the handle and the stop, substantially as described.

In testimony that I claim the foregoing as my own I have hereto affixed my signature in the presence of two witnesses.

DAVID D. KIMBERLIN.

Witnesses:
M. C. READ,
GEO. P. DENMAN.